United States Patent
Saikkonen

(10) Patent No.: US 6,868,330 B2
(45) Date of Patent: Mar. 15, 2005

(54) METHOD OF SETTING THE KNOCK DETECTION SENSOR OF A PISTON ENGINE

(75) Inventor: Ari Saikkonen, Vaasa (FI)

(73) Assignee: Wartsila Finland Oy, Vaasa (FI)

( * ) Notice: Subject to any disclaimer, the term of this patent is extended or adjusted under 35 U.S.C. 154(b) by 0 days.

(21) Appl. No.: 10/659,545

(22) Filed: Sep. 9, 2003

(65) Prior Publication Data
US 2004/0079138 A1 Apr. 29, 2004

(30) Foreign Application Priority Data
Sep. 12, 2002 (FI) .............................................. 20021634

(51) Int. Cl.$^7$ ................................................ G06G 7/70
(52) U.S. Cl. ............. 701/111; 123/406.16; 123/406.21; 123/406.29; 123/406.37; 123/406.39; 73/35.01; 73/35.09; 73/576; 73/578; 73/117.2; 73/118.1; 701/102; 701/114; 701/115
(58) Field of Search ................................. 701/111, 102, 701/114, 115; 123/406.16, 406.21, 406.29, 406.34, 406.37, 406.38, 406.39; 73/35.01, 35.09, 576, 578, 117.2, 118.1

(56) References Cited

U.S. PATENT DOCUMENTS

| | | | |
|---|---|---|---|
| 4,333,334 A | 6/1982 | Nakajima et al. | |
| 5,134,890 A * | 8/1992 | Abrams | 73/861.52 |
| 5,206,809 A * | 4/1993 | Iwakiri et al. | 701/111 |
| 5,333,489 A | 8/1994 | Dreyer | |
| 5,419,180 A | 5/1995 | Yamada et al. | |
| 5,428,986 A | 7/1995 | Dietsche et al. | |
| 6,062,199 A | 5/2000 | Entenmann et al. | |
| 6,246,952 B1 * | 6/2001 | Honda | 701/111 |
| 6,662,781 B1 * | 12/2003 | Torno et al. | 123/406.16 |
| 2002/0179051 A1 | 12/2002 | Sauler et al. | |

* cited by examiner

Primary Examiner—Willis R. Wolfe
Assistant Examiner—Johnny H. Hoang
(74) Attorney, Agent, or Firm—John Smith-Hill; Smith-Hill and Bedell

(57) ABSTRACT

A method of operating a knock detection system of a multi-cylinder piston engine in which the knock detection system comprises a sensor arranged in connection with each cylinder and a measurement circuit connected to the sensor includes running the engine at a load being less than full load and setting the output signal of each separate sensor between certain preset limits by adjusting one or more adjustment variables of the measurement circuit. The values of the adjustment variables for each separate cylinder are stored in the detection system. During normal use, the engine is run and the previously stored values of the adjustment values for each cylinder are used in the knock detection system.

14 Claims, 1 Drawing Sheet

METHOD OF SETTING THE KNOCK DETECTION SENSOR OF A PISTON ENGINE

BACKGROUND OF THE INVENTION

The invention relates to a method of setting the knock detection system of a multi-cylinder piston engine into active state, the detection system comprising at least a sensor arranged in connection with each cylinder and a measurement circuit in connection therewith.

Knocking as a phenomenon is known as such and it is detrimental for both the operation of the engine and the durability of the construction. It is important for unobstructed operation of the engine that the engine runs correctly, for example so that fuel ignition timing is not incorrect.

It is known in the art to use suitable sensors in connection with cylinders for detecting engine knocking. Acceleration sensors can, among others, be used for this purpose. Acceleration sensors use a piezoresistive crystal that generates voltage on the basis of dynamic mechanical pressure.

One problem associated with instrumentation of cylinders is, among others, that the properties, effects and operation sensitivity of the sensors and cabling are not quite identical in different units and, further, sensitivity can also change during use. Thus, the reliability of measurement can sometimes be somewhat dubious. Further, calibration of the system has in the past demanded a considerable amount of manual labor.

It is an aim of the present invention to provide a method of setting the knock detection system in an operation state that minimizes the problems associated with prior art. It is an especial aim of the invention to provide a method of setting the knock detection system into an operation state by means of which the problems caused, for example, by individual differences between the sensors can be minimized.

SUMMARY OF THE INVENTION

In a method embodying the invention for setting the knock detection system of a piston engine, especially one using the otto process, into operation state in connection with a multi-cylinder engine, the detection system comprising a sensor arranged in connection with each cylinder and a measurement circuit in connection therewith, the engine is run at a certain load, the load being less than full load, while the output signal of each sensor is simultaneously set between certain preset limits by adjusting one or more adjustment variables of the measurement circuit. Subsequent to this, the values of the adjustment variables are stored into the detection system. In normal use the engine is run and the stored values for the adjustment variables are used in the knock detection system. Preferably the gain of each measurement circuit is used as adjustment variable. In this case, average data is determined from the output of each sensor, the average data being then compared with the preset setpoint or desired value of the output. The measurement circuit gain of each cylinder is then adjusted so that the value of the determined average data is about the same as the setpoint of the output. The value of the gain for the sensor of the measurement circuit for each cylinder is stored in the detection system.

In a method embodying the invention, the outputs of the measurement circuits for the several cylinders are preferably set at equal respective levels by adjusting the gain of each measurement circuit for each cylinder at a time.

The knock detection system is set in connection with startup and/or running under load.

BRIEF DESCRIPTION OF THE DRAWINGS

In the following the invention is described by way of example and with reference to the appended drawings, in which.

DETAILED DESCRIPTION

Figure 1:
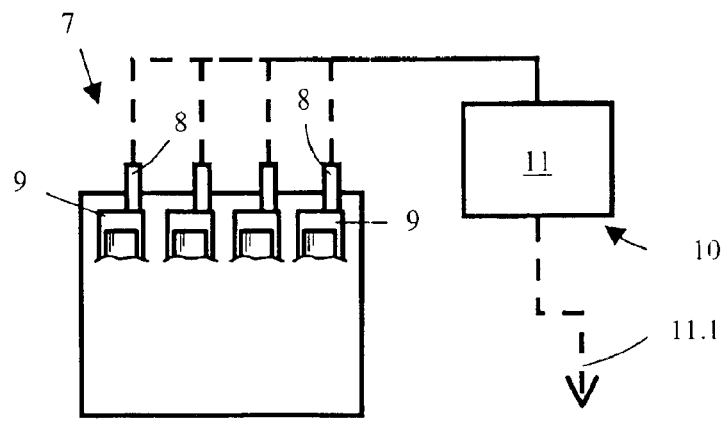
FIG. 1 is a schematic illustration of a piston engine using a method embodying the invention.

An engine using a method embodying the invention is in FIG. 1 referred to with reference number 7. The engine can be an otto engine, known as such. Each cylinder of the engine is provided with an acceleration sensor 8 arranged in connection with the compression volume of the particular cylinder 9. Each sensor 8 generates a signal having a measurement variable that depends on knocking of the engine. The sensor may include a piezoresistive crystal that generates a voltage signal of which the amplitude depends on knocking intensity. Each acceleration sensor is connected to a measurement circuit 11. The measurement circuit comprises means for processing the signal from the acceleration sensor and has at least one output 11.1 connected to other systems for monitoring and controlling the operation of the engine. For clarity of illustration, the several measurement circuits are shown collectively as a single block in FIG. 1, separate from the sensors 8, but they can also be integrated with the sensors 8. The measurement circuit may also be a part of the other engine management systems.

Figure 2:
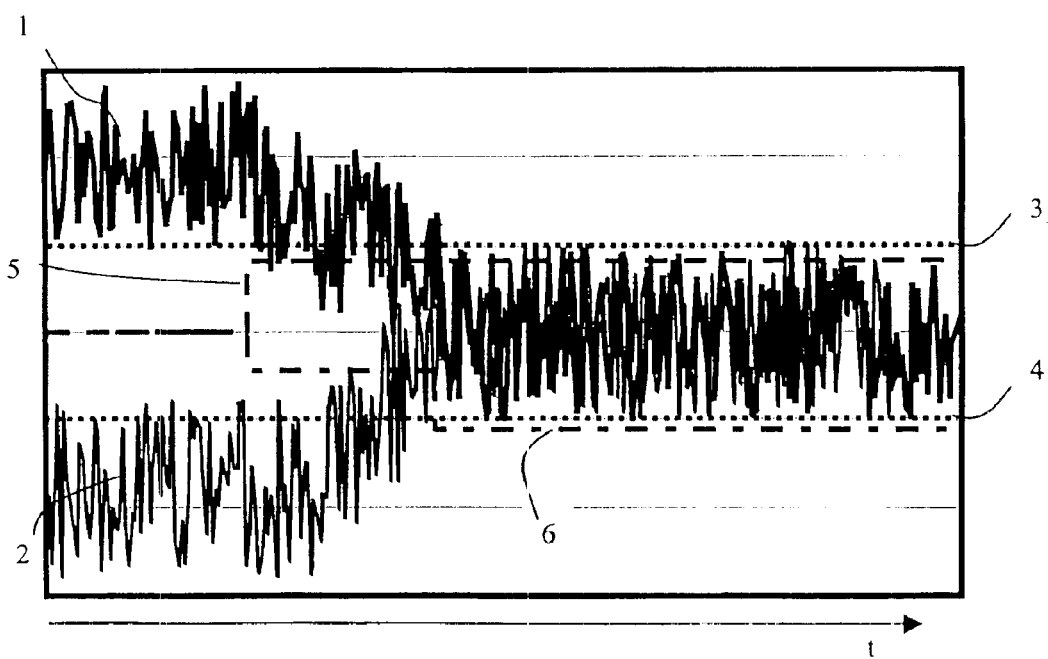
FIG. 2 is a schematic illustration of the setting procedure of a knock detection system in a method embodying the invention.

The procedure for setting or adjusting the knock detection system formed by the sensors 8 is carried out under an engine drive condition where it is quite sure there is no knocking. Preferably, the engine is during this time run at a constant load, whereby the conditions of the combustion and engine operation stay about constant as well. A suitable load is about 50–80% of the engine maximum load. As the engine runs, the sensors emit a signal to the detection system and the amplitude of the signal depends on the magnitude of knocking. In FIG. 2, reference numbers 1 and 2 illustrate the waveforms of exemplary signals from sensors in two cylinders during the method embodying the invention when, it will be recalled, there is no knocking. The gain of the sensor 1 is illustrated in graph 6, and the gain of the sensor 2 is illustrated in the graph 5. A window 3, 4 is defined for the limits of the signal of the sensor. When the engine is running at a constant load, the gain 6 of the sensor 1 of the first cylinder is set so that the waveform of the signal is within the window 3, 4. After this, the gain 5 of the sensor 2 of the second cylinder is changed so as to place the waveform of this signal also within the window 3, 4. The upper and lower limits of the window 3, 4 are determined empirically and depend on the sensitivity of the sensors.

The detection system correspondingly checks the signals from the sensors of the other cylinders and sets the gains, or other adjustment variables, of the respective sensors so as to maintain the signal waveforms within the window 3, 4. After this, the output signals of all sensors are on a mutually corresponding level and the engine can be run as the conditions demand. In normal use the knock detection system 10 uses in each sensor the gain determined by means of the above procedure. The knock detection system 10 will detect an abnormal level of engine knock and will also locate the cylinder in which the problem occurs.

The level of the signal at which knocking occurs is determined empirically depending on the type of engine and the type of sensors. In normal operation at full load, the level of the signal provided by the sensor, adjusted in accordance with the adjustment variable applied by the measurement circuit, may be higher than the level at partial load but will be lower than the knocking level.

It will be understood that adjustment of the gain of one or more sensors to the value required to maintain the signal waveform within the window 3, 4 may take place in several steps.

The invention is not limited to the embodiment described here, but a number of modifications thereof can be conceived of within the scope of the appended claims.

What is claimed is:

1. A method of adjusting a knock detection system for a piston engine having at least first and second cylinders, wherein the knock detection system comprises at least first and second sensors for said first and second cylinders respectively and a measuring means connected to the sensors, whereby the measuring means provides first and second signals indicating intensity of knocking in the first and second cylinders respectively, and wherein the measuring means has at least first and second adjustment variables for adjusting the ranges of said first and second signals respectively, said method comprising:

running the engine at a selected load less than full load, adjusting the first adjustment variable to bring the range of the first signal within preset limits and storing a corresponding value of the first adjustment variable, and adjusting the second adjustment variable to bring the range of the second signal within said preset limits and storing a corresponding value of the second adjustment variable.

2. A method according to claim 1, wherein the knock detection system comprises at least one sensor for each cylinder of the engine and the measuring means is connected to each of the sensors and provides a plurality of signals indicating intensity of knocking in the cylinders respectively, and the measuring means has a plurality of adjustment variables for adjusting the ranges of the plurality of signals respectively, and the method comprises adjusting the plurality of adjustment variables consecutively to bring the range of each signal within said preset limits and storing a corresponding value of each adjustment variable.

3. A method according to claim 1, comprising computing an average of the magnitude of the first signal, comparing the average value to a set point value, and, in the event that the average value is different from the set point value, adjusting the first adjustment variable to reduce the difference between the average value and the set point value.

4. A method according to claim 3, wherein the first adjustment variable is a voltage gain and the method comprises adjusting said voltage gain so that the average voltage is equal to the set point voltage.

5. A method according to claim 1, wherein the measuring means comprises a plurality of measurement circuits providing said plurality of signals respectively, the adjustment variables are gain values of the measurement circuits respectively and the method comprises storing the gain value for each measurement circuit.

6. A method according to claim 1, comprising adjusting the knock detection system on start up of the engine.

7. A method according to claim 6, comprising adjusting the knock detection system in connection with every start up of the engine.

8. A method of operating a piston engine having at least first and second cylinders and a knock detection system that comprises at least first and second sensors for said first and second cylinders respectively and a measuring means connected to the sensors, whereby the measuring means provides first and second signals indicating intensity of knocking in the first and second cylinders respectively, and wherein the measuring means has at least first and second adjustment variables for adjusting the ranges of said first and second signals respectively, said method comprising:

adjusting the knock detection system by running the engine at a selected load less than full load, adjusting the first adjustment variable to bring the range of the first signal within preset limits and storing a corresponding value of the first adjustment variable, and adjusting the second adjustment variable to bring the range of the second signal within said preset limits and storing a corresponding value of the second adjustment variable, and subsequently running the engine at full load and operating the knock detection system with the first and second adjustment variables set to the stored values respectively.

9. A method according to claim 8, wherein the knock detection system comprises at least one sensor for each cylinder of the engine and the measuring means is connected to each of the sensors and provides a plurality of signals indicating intensity of knocking in the cylinders respectively, and the measuring means has a plurality of adjustment variables for adjusting the ranges of the plurality of signals respectively, and the method comprises adjusting the plurality of adjustment variables consecutively to bring the range of each signal within said preset limits and storing a corresponding value of each adjustment variable.

10. A method according to claim 8, comprising computing an average of the magnitude of the first signal, comparing the average value to a set point value, and, in the event that the average value is different from the set point value, adjusting the first adjustment variable to reduce the difference between the average value and the met point value.

11. A method according to claim 10, wherein the first adjustment variable is a voltage gain and the method comprises adjusting said voltage gain so that the average voltage is equal to the set point voltage.

12. A method according to claim 8, wherein the measuring means comprises a plurality of measurement circuits providing said plurality of signals respectively, the adjustment variables are gain values of the measurement circuits respectively and the method comprises storing the gain value for each measurement circuit.

13. A method according to claim 8, comprising adjusting the knock detection system on start up of the engine.

14. A method according claim 13, comprising adjusting the knock detection system in connection with every start up of the engine.

* * * * *

UNITED STATES PATENT AND TRADEMARK OFFICE
CERTIFICATE OF CORRECTION

PATENT NO. : 6,868,330 B2
DATED : March 15, 2005
INVENTOR(S) : Ari Saikkonen

It is certified that error appears in the above-identified patent and that said Letters Patent is hereby corrected as shown below:

<u>Column 4,</u>
Line 45, "met" should be deleted and replaced with -- set --.

Signed and Sealed this

Seventeenth Day of May, 2005

JON W. DUDAS
*Director of the United States Patent and Trademark Office*